United States Patent
Zhu et al.

(10) Patent No.: US 10,952,143 B2
(45) Date of Patent: *Mar. 16, 2021

(54) SLEEPING AND WAKE-UP METHODS AND APPARATUSES OF MASTER-SLAVE NETWORK, AND POWER SAVING SYSTEM OF MASTER-SLAVE NETWORK

(71) Applicant: HUAWEI TECHNOLOGIES CO., LTD., Guangdong (CN)

(72) Inventors: Chong Zhu, Wuhan (CN); Peng Chen, Wuhan (CN); Zhirong Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/564,515

(22) Filed: Sep. 9, 2019

(65) Prior Publication Data
US 2020/0008150 A1   Jan. 2, 2020

Related U.S. Application Data

(63) Continuation of application No. 15/540,708, filed as application No. PCT/CN2014/096017 on Dec. 31, 2014, now Pat. No. 10,440,648.

(51) Int. Cl.
*H04W 52/02*   (2009.01)
*H04W 84/18*   (2009.01)
(Continued)

(52) U.S. Cl.
CPC ... *H04W 52/0229* (2013.01); *H04W 52/0216* (2013.01); *H04W 52/0245* (2013.01);
(Continued)

(58) Field of Classification Search
CPC ... H04W 52/0229; H04W 84/04; Y02D 30/70
See application file for complete search history.

(56) References Cited

U.S. PATENT DOCUMENTS

2002/0082060 A1* 6/2002 Kang ............... G06F 1/3209
                                                        455/574
2005/0208966 A1   9/2005 David et al.
(Continued)

FOREIGN PATENT DOCUMENTS

| CN | 1671231 A | 9/2005 |
| CN | 10151932 A | 9/2009 |
| CN | 103516672 A | 1/2014 |

*Primary Examiner* — Samina F Choudhry
(74) *Attorney, Agent, or Firm* — Fish & Richardson P.C.

(57) ABSTRACT

Example sleeping and wake-up methods and apparatuses of a master-slave network, and a power saving system of a master-slave network, are described. One example method includes obtaining running statuses of slave devices on links from a link management list. A target device is determined. The target device is a slave device whose running status is idle. If running statuses of the target slave device to an end slave device on a link on which the target slave device is located are all idle, it is determined that a sublink from the target slave device to the end slave device on the link on which the target slave device is located is a target sublink. A power saving message is sent to at least one slave device on the target sublink, so that the slave device enters a sleep and listen state when receiving the power saving message.

20 Claims, 10 Drawing Sheets

(51) Int. Cl.
*H04W 84/20* (2009.01)
*H04W 84/04* (2009.01)

(52) U.S. Cl.
CPC ............ *H04W 84/04* (2013.01); *H04W 84/18* (2013.01); *H04W 84/20* (2013.01); *Y02D 30/70* (2020.08)

(56) References Cited

U.S. PATENT DOCUMENTS

2013/0133262 A1  5/2013  Marchetto et al.
2014/0119252 A1  5/2014  Kella et al.

\* cited by examiner ously mentioned patent applications are hereby incorporated by

SLEEPING AND WAKE-UP METHODS AND APPARATUSES OF MASTER-SLAVE NETWORK, AND POWER SAVING SYSTEM OF MASTER-SLAVE NETWORK

CROSS-REFERENCE TO RELATED APPLICATIONS

This application is a continuation of U.S. patent application Ser. No. 15/540,708, filed on Jun. 29, 2017, which is a national stage of International Application No. PCT/CN2014/096017, filed on Dec. 31, 2014. All of the aforementioned patent applications are hereby incorporated by reference in their entireties.

TECHNICAL FIELD

The present invention relates to the field of wireless communications technologies, and in particular, to sleeping and wake-up methods and apparatuses of a master-slave network, and a power saving system of a master-slave network.

BACKGROUND

With development of wireless network technologies, radio-frequency coverage of a single device cannot meet requirements for wide coverage and high throughput performance. Therefore, in the prior art, multiple devices cooperatively work to implement hybrid networking and form a master-slave network, so as to meet the foregoing requirements.

The master-slave network includes a master device (MD), at least one slave device (SD), and at least one user device (UD). The master device is configured to manage all slave devices in the master-slave network, and the master device may further radiate to the outside, so as to provide a service to user devices. The slave device is configured to cooperate with the master device to implement a service function, and provide a data forwarding channel to a lower-level slave device. Moreover, the slave device may further radiate to the outside and cooperate with the master device to provide a service to user devices.

In an existing communications protocol, a power saving mechanism between a single device (for example, a master device or a slave device) and a user device is defined in a master-slave network. However, the prior art defines only the power saving mechanism between a single device (a master device or a slave device) and a user device, but lacks a power saving mechanism between the master device and the slave device.

SUMMARY

The present invention provides sleeping and wake-up methods and apparatuses of a master-slave network, and a system, so as to provide a power saving mechanism between a master device and a slave device, and reduce system energy consumption.

According to a first aspect, the present invention provides a sleeping method of a master-slave network, where the master-slave network includes a master device and at least one slave device, the at least one slave device forms at least one link, and adjacent slave devices on each link have a hierarchical cascading relationship; and the method is applied to the master device, and the method includes:

obtaining, from a link management list, running statuses of slave devices on links, where the link management list is used to store a cascading relationship between the slave devices on the links of the master-slave network, and a running status of each slave device;

determining a target device, where the target device is a slave device whose running status is idle;

if running statuses of the target slave device to an end slave device on a link on which the target slave device is located are all idle, determining that a sublink from the target slave device to the end slave device on the link on which the target slave device is located is a target sublink; and sending a power saving message to at least one slave device on the target sublink, so that the slave device enters a sleep and listen state when receiving the power saving message, where the sleep and listen state is a running status indicating that signal transmission is disabled.

With reference to the first aspect, in a first possible implementation manner of the first aspect, before the obtaining, from a link management list, running statuses of slave devices on links, the method further includes:

receiving an idle state message sent by a first slave device, where the idle state message is used to indicate that all user devices connected to the first slave device already disconnect from the first slave device; and updating a running status of the first slave device in the link management list to an idle state.

With reference to the first aspect, in the first aspect or the first possible implementation manner of the first aspect, a second possible implementation manner of the first aspect is further provided, and in the second possible implementation manner of the first aspect, the method further includes:

obtaining a related list of each slave device, where the related list is used to record a lower-level slave device connected to the slave device;

determining a hierarchical cascading relationship between each slave device and the lower-level slave device of the slave device according to the related list;

obtaining a topological relationship of the master-slave network according to the determined hierarchical cascading relationship;

obtaining all end slave devices in the topological relationship, where the end slave device is a slave device having no lower-level slave device; and determining at least one link according to each end slave device.

With reference to the first aspect, in the first aspect or the first or the second possible implementation manner of the first aspect, a third possible implementation manner of the first aspect is further provided, and in the third possible implementation manner of the first aspect, the method further includes:

if the running statuses of all the slave devices in the link management list are idle, entering, by the master device, a sleep and listen state.

With reference to the first aspect, in the first aspect or the first, the second, or the third possible implementation manner of the first aspect, a fourth possible implementation manner of the first aspect is further provided, and in the fourth possible implementation manner of the first aspect, the sending a power saving message to at least one slave device on the target sublink includes:

sending the power saving message to all slave devices on the target sublink; or selecting one slave device level by level from the end slave device of the target sublink, and sequentially sending the power saving message to the selected slave device; or sending the power saving message to a preset slave device on the target sublink.

With reference to the first aspect, in the first aspect or the first, the second, or the third possible implementation manner of the first aspect, a fifth possible implementation manner of the first aspect is further provided, and in the fifth possible implementation manner of the first aspect, the method further includes:

timing running duration of the master-slave network, and if a timing result is greater than preset running duration, sending the power saving message to each slave device; or if a system time reaches a preset power saving time, sending the power saving message to each slave device.

According to a second aspect, the present invention further provides a wake-up method of a master-slave network, where the master-slave network includes a master device and at least one slave device, the at least one slave device forms at least one link, and adjacent slave devices on each link have a hierarchical cascading relationship; and the method is applied to a slave device in a sleep and listen state, the sleep and listen state is a running status indicating that signal transmission is disabled, and the method includes:

determining, according to detected radio-frequency signal strengths or a received detection request, whether to perform wake-up, where the detection request is used to connect to the master-slave network;

if it is determined to perform wake-up, switching to an operating state, where the operating state is a running status indicating that signal transmission is enabled; and waking up all slave devices from the slave device to the master device on a link on which the slave device is located.

With reference to the second aspect, in a first possible implementation manner of the second aspect, the determining, according to radio-frequency signal strengths detected by the slave device, whether to perform wake-up specifically includes:

determining a fluctuation difference of the radio-frequency signal strengths according to differences between the detected radio-frequency signal strengths; and if the fluctuation difference is greater than a preset fluctuation difference, determining to perform wake-up.

With reference to the second aspect, in a second possible implementation manner of the second aspect, the determining, according to a received detection request, whether to perform wake-up specifically includes:

obtaining information about a user device that is carried in the detection request;

determining whether a user device list stores the information about the user device; and if the information about the user device is stored, determining to perform wake-up.

With reference to the second aspect, in the second aspect or the first or the second possible implementation manner of the second aspect, a third possible implementation manner of the second aspect is further provided, and in the third possible implementation manner of the second aspect, the method further includes:

enabling timing when the slave device disables signal transmission; and if a timing result is greater than preset power saving duration, sending the wake-up indication to each slave device from the slave device to an end slave device on the link on which the slave device is located; or if a system time reaches a preset wake-up time, sending the wake-up indication to each device from the slave device to an end slave device on the link on which the slave device is located.

According to a third aspect, the present invention provides a sleeping apparatus of a master-slave network, where the master-slave network includes a master device and at least one slave device, the at least one slave device forms at least one link, and adjacent slave devices on each link have a hierarchical cascading relationship; and the apparatus is located in the master device, and the apparatus includes:

an obtaining unit, configured to obtain, from a link management list, running statuses of slave devices on links, where the link management list is used to store a cascading relationship between the slave devices on the links of the master-slave network, and a running status of each slave device;

a determining unit, configured to: determine a target device from the link obtained by the obtaining unit, where the target device is a slave device whose running status is idle; and when running statuses of the target slave device to an end slave device on a link on which the target slave device is located are all idle, determine that a sublink from the target slave device to the end slave device on the link on which the target slave device is located is a target sublink; and a sending unit, configured to send a power saving message to at least one slave device on the target sublink determined by the determining unit, so that the slave device enters a sleep and listen state when receiving the power saving message, where the sleep and listen state is a running status indicating that signal transmission is disabled.

With reference to the third aspect, in a first possible implementation manner of the third aspect, the apparatus further includes:

a receiving unit, configured to receive an idle state message sent by a first slave device, where the idle state message is used to indicate that all user devices connected to the first slave device already disconnect from the first slave device; and an update unit, configured to update a running status of the first slave device in the link management list to an idle state according to the idle state message received by the receiving unit.

With reference to the third aspect, in the third aspect or the first possible implementation manner of the third aspect, a second possible implementation manner of the third aspect is further provided, and in the second possible implementation manner of the third aspect, the obtaining unit is further configured to obtain a related list of each slave device, where the related list is used to record a lower-level slave device connected to the slave device;

the determining unit is further configured to: determine a hierarchical cascading relationship between each slave device and the lower-level slave device of the slave device according to the related list received by a second receiving unit, and obtain a topological relationship of the master-slave network according to the determined hierarchical cascading relationship;

the obtaining unit is further configured to obtain all end slave devices in the topological relationship obtained by the second determining unit, where the end slave device is a slave device having no lower-level slave device; and the determining unit is further configured to determine at least one link according to each end slave device.

With reference to the third aspect, in the third aspect or the first or the second possible implementation manner of the third aspect, a third possible implementation manner of the third aspect is further provided, and in the third possible implementation manner of the third aspect, the sending unit is further configured to: when the running statuses of all the slave devices in the link management list are idle, enter a sleep and listen state.

With reference to the third aspect, in the third aspect or the first, the second, or the third possible implementation manner of the third aspect, a fourth possible implementation manner of the third aspect is further provided, and in the fourth possible implementation manner of the third aspect, the sending unit is further configured to:

send the power saving message to all slave devices on the target sublink; or select one slave device level by level from the end slave device of the target sublink, and sequentially send the power saving message to the selected slave device; or send the power saving message to a preset slave device on the target sublink.

With reference to the third aspect, in the third aspect or the first, the second, or the third possible implementation manner of the third aspect, a fifth possible implementation manner of the third aspect is further provided, and in the fifth possible implementation manner of the third aspect, the apparatus further includes:

a timing unit, configured to time running duration of the master-slave network; and the sending unit is further configured to: when a timing result obtained by the timing unit is greater than preset running duration, send the power saving message to each slave device; or the sending unit is further configured to: when a system time reaches a preset power saving time, send the power saving message to each slave device.

According to a fourth aspect, the present invention further provides a wake-up apparatus of a master-slave network, where the master-slave network includes a master device and at least one slave device, the at least one slave device forms at least one link, and adjacent slave devices on each link have a hierarchical cascading relationship; and the apparatus is located in a slave device in a sleep and listen state, the sleep and listen state is a running status indicating that signal transmission is disabled, and the apparatus includes:

a determining unit, configured to determine, according to radio-frequency signal strengths detected by a receiving unit or a detection request received by a receiving unit, whether wake-up is to be performed, where the detection request is used to connect to the master-slave network;

a switching unit, configured to: when the determining unit determines that wake-up is to be performed, switch to an operating state, where the operating state is a running status indicating that signal transmission is enabled; and a sending unit, configured to: when the determining unit determines that wake-up is to be performed, wake up all slave devices from the slave device to the master device on a link on which the slave device is located.

With reference to the fourth aspect, in a first possible implementation manner of the fourth aspect, the determining unit is further configured to: determine a fluctuation difference of the radio-frequency signal strengths according to differences between the radio-frequency signal strengths detected by the receiving unit; and when the fluctuation difference is greater than a preset fluctuation difference, determine that wake-up is to be performed.

With reference to the fourth aspect, in a second possible implementation manner of the fourth aspect, the determining unit is further configured to: obtain information about a user device that is carried in the detection request; determine whether a user device list stores the information about the user device; and if the information about the user device is stored, determine that wake-up is to be performed.

With reference to the fourth aspect, in the fourth aspect or the first or the second possible implementation manner of the fourth aspect, a third possible implementation manner of the fourth aspect is further provided, and in the third possible implementation manner of the fourth aspect, the apparatus further includes:

a timing unit, configured to enable timing when the broadcasting unit disables signal transmission; and the sending unit is further configured to: when a timing result of the timing unit is greater than preset power saving duration, send the wake-up indication to each slave device from the slave device to an end slave device on the link on which the slave device is located; or the sending unit is further configured to: when a system time reaches a preset wake-up time, send the wake-up indication to each slave device from the slave device to an end slave device on the link on which the slave device is located.

According to a fifth aspect, the present invention further provides a power saving system of a master-slave network, including the sleeping apparatus of a master-slave network according to the third aspect and the wake-up apparatus of a master-slave network according to the fourth aspect.

According to a sixth aspect, the present invention provides a sleeping apparatus of a master-slave network, where the master-slave network includes a master device and at least one slave device, the at least one slave device forms at least one link, and adjacent slave devices on each link have a hierarchical cascading relationship; and the apparatus is located in the master device, and the apparatus includes:

a processor, configured to: obtain, from a link management list, running statuses of slave devices on link, where the link management list is used to store a cascading relationship between the slave devices on the links of the master-slave network, and a running status of each slave device;

determine a target device, where the target device is a slave device whose running status is idle; and if running statuses of the target slave device to an end slave device on a link on which the target slave device is located are all idle, determine that a sublink from the target slave device to the end slave device on the link on which the target slave device is located is a target sublink; and a transmitter, configured to send a power saving message to at least one slave device on the target sublink, so that the slave device enters a sleep and listen state when receiving the power saving message, where the sleep and listen state is a running status indicating that signal transmission is disabled.

With reference to the sixth aspect, in a first possible implementation manner of the sixth aspect, the apparatus further includes:

a receiver, configured to receive an idle state message sent by a first slave device, where the idle state message is used to indicate that all user devices connected to the first slave device already disconnect from the first slave device; and the transmitter is further configured to update a running status of the first slave device in the link management list to an idle state.

With reference to the sixth aspect, in the sixth aspect or the first possible implementation manner of the sixth aspect, a second possible implementation manner of the sixth aspect is further provided, and in the second possible implementation manner of the sixth aspect, the processor is further configured to:

obtain a related list of each slave device, where the related list is used to record a lower-level slave device connected to the slave device;

determine a hierarchical cascading relationship between each slave device and the lower-level slave device of the slave device according to the related list;

obtain a topological relationship of the master-slave network according to the determined hierarchical cascading relationship;

obtain all end slave devices in the topological relationship, where the end slave device is a slave device having no lower-level slave device; and determine at least one link according to each end slave device.

With reference to the sixth aspect, in the sixth aspect or the first or the second possible implementation manner of the sixth aspect, a third possible implementation manner of the sixth aspect is further provided, and in the third possible implementation manner of the sixth aspect, the transmitter is further configured to: when the running statuses of all the slave devices in the link management list are idle, enter a sleep and listen state.

With reference to the sixth aspect, in the sixth aspect or the first, the second, or the third possible implementation manner of the sixth aspect, a fourth possible implementation manner of the sixth aspect is further provided, and in the fourth possible implementation manner of the sixth aspect, the transmitter is further configured to:

send the power saving message to all slave devices on the target sublink; or select one slave device level by level from the end slave device of the target sublink, and sequentially send the power saving message to the selected slave device; or send the power saving message to a preset slave device on the target sublink.

With reference to the sixth aspect, in the sixth aspect or the first, the second, or the third possible implementation manner of the sixth aspect, a fifth possible implementation manner of the sixth aspect is further provided, and in the fifth possible implementation manner of the sixth aspect, the processor is further configured to time running duration of the master-slave network; and the transmitter is further configured to: when a timing result of the processor is greater than preset running duration, send the power saving message to each slave device; or the transmitter is further configured to: when a system time reaches a preset power saving time, send the power saving message to each slave device.

According to a seventh aspect, the present invention further provides a wake-up apparatus of a master-slave network, where the master-slave network includes a master device and at least one slave device, the at least one slave device forms at least one link, and adjacent slave devices on each link have a hierarchical cascading relationship; and the method is applied to a slave device in a sleep and listen state, the sleep and listen state is a running status indicating that signal transmission is disabled, and the apparatus includes:

a processor, configured to determine, according to radio-frequency signal strengths detected by a receiver or a detection request received by the receiver, whether wake-up is to be performed, where the detection request is used to connect to the master-slave network; and if it is determined that wake-up is to be performed, switch to an operating state, where the operating state is a running status indicating that signal transmission is enabled; and a transmitter, configured to: when the processor determines that wake-up is to be performed, wake up all slave devices from the slave device to the master device on a link on which the slave device is located.

With reference to the seventh aspect, in a first possible implementation manner of the seventh aspect, the processor is further configured to: determine a fluctuation difference of the radio-frequency signal strengths according to differences between the detected radio-frequency signal strengths; and when the fluctuation difference is greater than a preset fluctuation difference, determine that wake-up is to be performed.

With reference to the seventh aspect, in a second possible implementation manner of the seventh aspect, the processor is further configured to: obtain information about a user device that is carried in the detection request;

determine whether a user device list stores the information about the user device, where the user device list is used to record information about a user device that previously connects to the slave device; and if the information about the user device is stored, determine that wake-up is to be performed.

With reference to the seventh aspect, in the seventh aspect or the first or the second possible implementation manner of the seventh aspect, a third possible implementation manner of the seventh aspect is further provided, and in the third possible implementation manner of the seventh aspect, the processor is further configured to enable timing when the transmitter disables signal transmission; and the transmitter is further configured to: when a timing result of the processor is greater than preset power saving duration, send the wake-up indication to each slave device from the slave device to an end slave device on the link on which the slave device is located; or the transmitter is further configured to: when a system time reaches a preset wake-up time, send the wake-up indication to each slave device from the slave device to an end slave device on the link on which the slave device is located.

According to an eighth aspect, the present invention further provides a power saving system of a master-slave network, including the sleeping apparatus of a master-slave network according to the sixth aspect and the wake-up apparatus of a master-slave network according to the seventh aspect.

According to the sleeping and wake-up methods and apparatuses of a master-slave network, and the power saving system of a master-slave network that are provided in the present invention, a power saving process is divided into a sleeping process and a wake-up process. In the sleeping process, a master device determines a target sublink according to an idle state, recorded in a link management list, of a slave device, and then sends a power saving message to at least one slave device on the target sublink. After receiving the power saving message, the slave device disables signal transmission and enters a sleep and listen state, so as to achieve a power saving effect. In the wake-up process, a slave device in a sleep and listen state determines, by detecting a surrounding signal (a radio-frequency signal strength or a detection request), whether to perform wake-up; after the slave device is woken up, a slave device on a target sublink is woken up, so that when a terminal belonging to the slave device needs to use a network, a link from the slave device to a master device is woken up, so as to provide a network service to the terminal.

By means of the foregoing two processes, in the present invention, when no terminal needs a network, all or some slave devices on a target sublink (or an entire link or multiple links or even all links) of a master-slave network can be controlled to close signal transmission, so as to achieve a power saving effect. After closing signal transmission, a slave device listens to a surrounding signal, to determine whether there is a terminal needing to use a network. When a terminal needs to use the network, the slave device can automatically wake up all slave devices between the slave device and a master device, so as to provide a corresponding network service to the terminal, thereby ensuring network reliability.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

A master-slave network includes a master device and at least one slave device, the at least one slave device forms at least one link, and adjacent slave devices on each link have a hierarchical cascading relationship.

Figure 1:
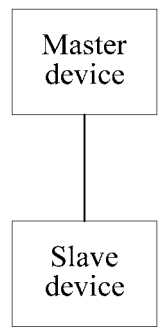
FIG. 1 is a schematic diagram of a system architecture of a master-slave network according to an embodiment of the present invention.
Figure 2:
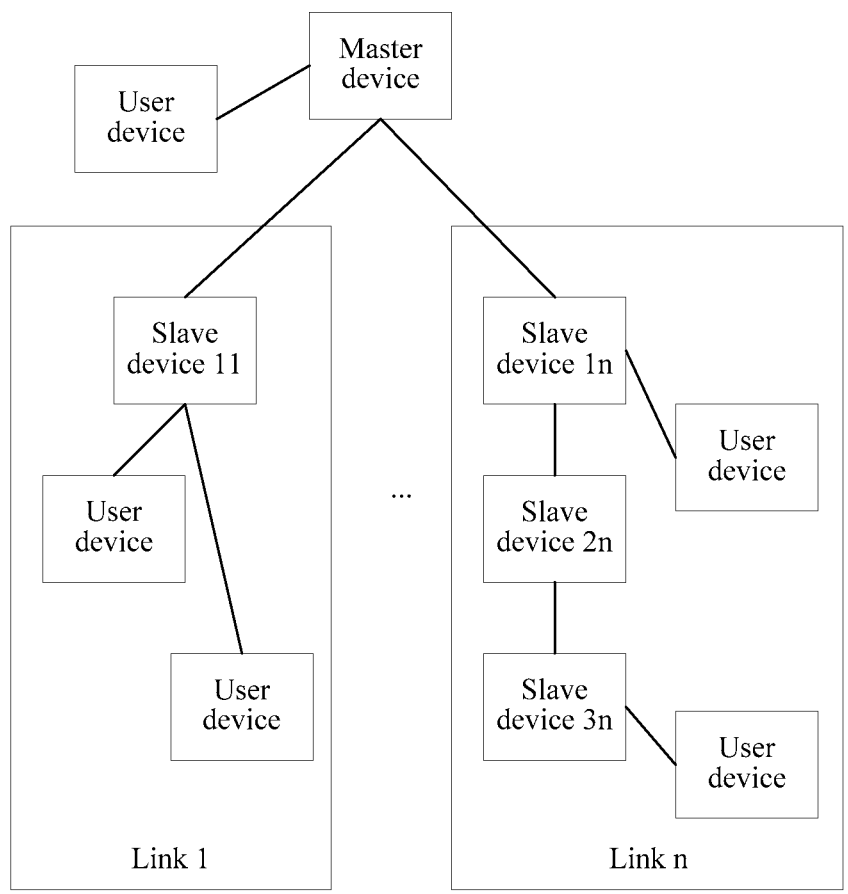
FIG. 2 is a schematic diagram of a system architecture of another master-slave network according to an embodiment of the present invention.

Because a user device establishes a connection to the master-slave network according to a use requirement for the network, a user device in the master-slave network may migrate to or disconnect from the master-slave network. To provide a sufficient network service for user-equipment (UE), the master-slave network supports migration of a slave device, and in a master-slave network having a master device and a slave device, an access request from any user device in a radiation range may be received. It can be seen that, a simple configuration of the master-slave network is shown in FIG. 1, that is, the master-slave network includes one master device and one slave device, and this configuration is less common. Generally, as shown in FIG. 2, a master-slave network includes multiple slave devices and multiple user devices. A common configuration of the master-slave network is that multiple slave devices form multiple links, and the slave devices and a master device each may provide an access service for a user device. In an application example of the master-slave network shown in FIG. 2, centralized Wi-Fi management networking based on an access point controller (AC) is widely applied. The AC (equivalent to the master device in the present invention) uses a management protocol to control multiple access points (AP) (equivalent to the slave device in the present invention) and to perform network deployment, and each AP, similar to a remote antenna, provides a Wi-Fi connection service for a user device (such as a mobile phone). The management protocol between the AC and the AP includes the Control and Provisioning of Wireless Access Points Protocol (CAPWAP).

The master device (MD) in the master-slave network has a function of managing the slave device. Therefore, the master-slave network is also referred to as an autonomous network.

In the autonomous network, functions of the master device MD are: 1) taking charge of managing a slave device belonging to the autonomous network; 2) when master devices need to communicate with each other, completing communication interaction with another master device based on a communications protocol (MDP) between master devices; and 3) optionally, undertaking a service capability of the slave device, and providing a service to the outside (broadcasting a radio-frequency signal available for a user device).

In the autonomous network, functions of the slave device SD are: 1) cooperating with the master device to complete a service function, and providing a service to the outside (broadcasting a radio-frequency signal available for a user device); and 2) providing a management signaling channel and a service forwarding channel to a lower-level slave device.

In the autonomous network, a function of a user device (UD) is: obtaining a service by connecting to the autonomous network managed by the master device. The user device itself does not provide a service to the outside.

It can be known from the foregoing function definition that, the master device may have the function of the slave device. Based on this, the master-slave network in the embodiments of the present invention may include one master device, and the master device has the function of the slave device.

The prior art provides only a power saving mechanism between a user device and a slave device, but lacks a power saving mechanism between a master device and the slave device. In the prior art, when there is no user device on a link in a master-slave network, slave devices on the link may be all in an operating state, and electric energy is consumed while no slave device on the link provides a service to a user device, and resulting in a waste of power. To resolve the foregoing technical problem, the embodiments of the present invention provide sleeping and wake-up methods of a master-slave network. A main idea is: When no user device is connected to a link in a master-slave network, a master device controls all or some slave devices on the link to disable signal transmission and enter a sleep and listen state (wait to be woken up). After a slave device enters the sleep and listen state, when a wake-up need is detected, automatic wake-up is performed to wake up slave devices between the slave device and the master device, so as to provide a service to a user device. The following separately describes the sleeping method of a master-slave network and the wake-up method of a master-slave network.

Figure 3:
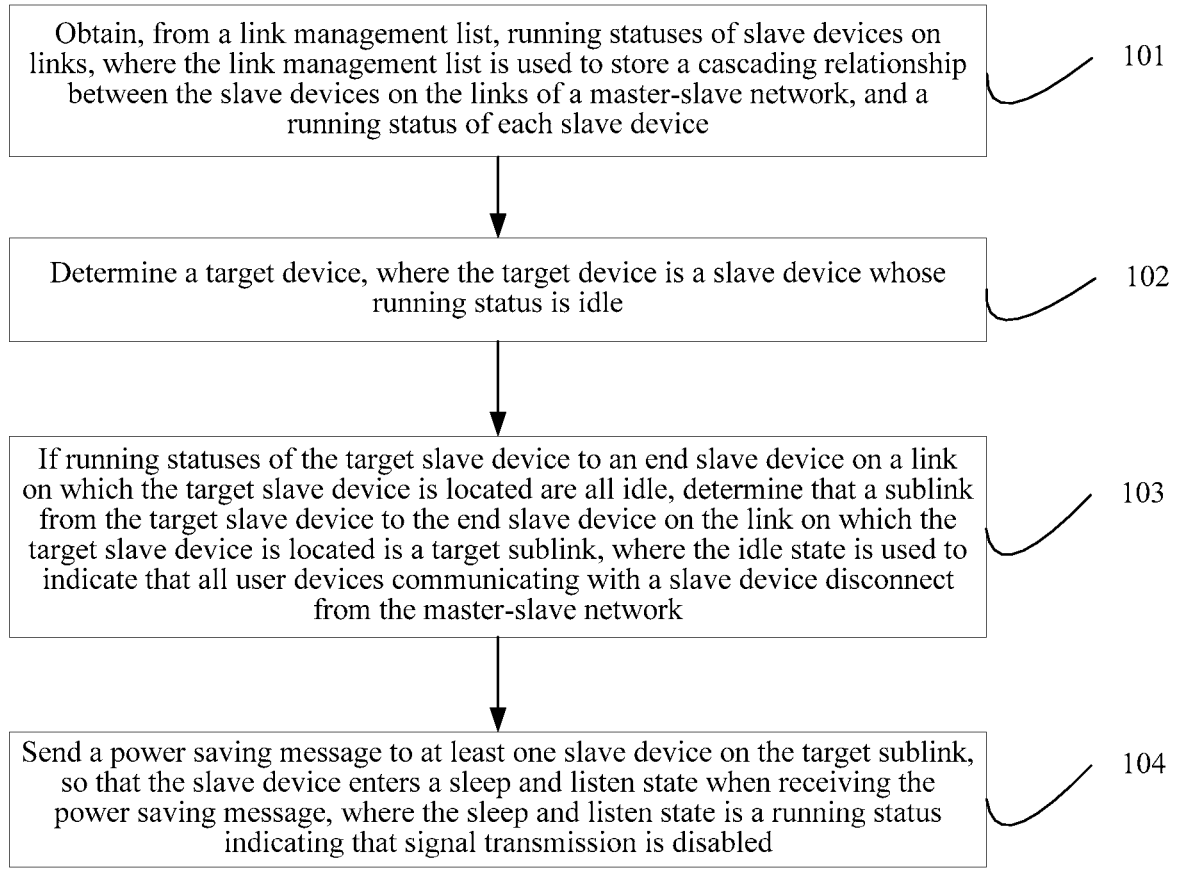
FIG. 3 is a flowchart of a first sleeping method of a master-slave network according to an embodiment of the present invention.

A sleeping method of a master-slave network is provided. The master-slave network includes a master device and at least one slave device, the at least one slave device forms at least one link, and adjacent slave devices on each link have a hierarchical cascading relationship. The method is applied to the master device, and as shown in FIG. 3, the method includes:

Step 101: Obtain, from a link management list, running statuses of slave devices on link, where the link management list is used to store a cascading relationship between slave devices on the links of the master-slave network, and a running status of each slave device.

Entries of the link management list are shown in Table 1. A slave device identification number is used to uniquely identify a slave device, a link identifier is used to uniquely identify a link formed by slave devices, and an uppermost-level slave device of the link is associated in cascade with the master device. A same slave device may simultaneously exist on different links. The running status includes an operating state, an idle state, and a sleep and listen state. In the operating state or the idle state, normal communication can be performed and a normal service can be provided. In this case, each slave device enables radio-frequency signal transmission. A difference lies in that the operating state is used to identify that a user device connects to the slave device, and the idle state is used to identify that all user devices connected to the slave device disconnect from the slave device. The sleep and listen state is a state indicating that the slave device disables signal transmission. In this case, the slave device can receive a signal but cannot transmit a signal. Therefore, compared with the operating state and the idle state, power of the slave device is significantly reduced. A slave device in a sleep and listen state cannot provide an access service to a user, and needs to be woken up to enable a signal transmission function for a user device, so as to provide an access service to the user device. For example, after a slave device enters a sleep and listen state, wake-up is performed according to a surrounding signal strength or the like, and a signal transmission function is enabled after the wake-up, to ensure that a user device can perform normal communication by using the slave device.

TABLE 1

| Slave device identification number | Link identifier | Running status | Upper-level slave device | Lower-level slave device |
| --- | --- | --- | --- | --- |

For example, it can be known from the link management list shown in Table 2 that, the master device manages three links in total, which are separately a link a, a link b, and a link c. A top-down cascading relationship of the link a is a1, a2, and a3, a top-down cascading relationship of the link b is b1, b2, and b3, and a top-down cascading relationship of the link c is c1, c2, and c3. Running statuses of three slave devices on the link a are all running; running statuses of three slave devices on the link b are all idle; and on the link c, a running status of the slave device c1 is running, and running statuses of the slave devices c2 and c3 are idle.

TABLE 2

| Slave device identification number | Link identifier | Running status | Upper-level slave device | Lower-level slave device |
| --- | --- | --- | --- | --- |
| a1 | a | Running | Null | a2 |
| a2 | a | Running | a1 | a3 |
| a3 | a | Running | a2 | Null |
| b1 | b | Idle | Null | b2 |
| b2 | b | Idle | b1 | b3 |
| b3 | b | Idle | b2 | Null |
| c1 | c | Running | Null | c2 |
| c2 | c | Idle | c1 | c3 |
| c3 | c | Idle | c2 | Null |

Step 102: Determine a target device, where the target device is a slave device whose running status is idle.

The target device may be selected randomly, or selected in a preset sequence. An example of the preset sequence is: selecting a link randomly (or sequentially), and determining that an end slave device of the link (or a top slave device of the link) is the target slave device.

Step 103: If running statuses of the target slave device to an end slave device on a link on which the target slave device is located are all idle, determine that a sublink from the target slave device to the end slave device on the link on which the target slave device is located is a target sublink, where the idle state is used to indicate that all user devices communicating with a slave device disconnect from the master-slave network.

After obtaining the running statuses of all the slave devices, the master device performs determining on slave devices on each link sequentially from an upper level to a lower level. Specific steps of the determining are: obtaining a running status of a current slave device a1; if the running status of the slave device a1 (a starting slave device of the link a) is an idle state, determining whether a running status of a lower-level slave device a2 of the slave device a1 is an idle state; and if the running status of the slave device a2 is an idle state, determining whether a running status of a lower-level slave device a3 of the slave device a2 is an idle state. By analogy, only when a running status of a current slave device is an idle state, it is determined whether an operating state of a lower-level subordinate device of the current slave device is an idle state. If the slave device a1 to an end slave device an of the link a each are in an idle state, it is determined that the link a is a target sublink. Therefore, the entire link is determined as a target sublink. If a slave device a5 to an slave device an (n is greater than 5) each are in an idle state, it is determined that a sublink from the slave device a5 to the slave device an is a target sublink. Therefore, a link segment in the entire link may be determined as a target sublink, and the end slave device an of the link is used as a cut-off device of the link segment.

When a sublink is a target sublink, it indicates that no user device is connected to a slave device on the sublink. In this case, after signal transmission is disabled, power can be saved without affecting a network need of a user device. Using Table 2 as an example, because all slave devices on the link b are idle, the link b is a target sublink; because the slave device c2 and the slave device c3 on the link c are in an idle state, a sublink formed by c2 and c3 is also a target link.

Step 104: Send a power saving message to at least one slave device on the target sublink, so that the slave device enters a sleep and listen state when receiving the power saving message, where the sleep and listen state is a running status indicating that signal transmission is disabled.

After a target sublink is found, a power saving effect can be achieved as long as one slave device on the target sublink is controlled to close signal transmission, and a better power saving effect can be achieved when more slave devices close signal transmission. Moreover, a slave device can still receive a signal when the slave device disables signal transmission, so that the slave device restores signal transmission at any time according to a need, and enters an operating state. The power saving message may be defined according to a use habit of a user. For example, a predefined identifier is added to existing signaling, the slave device obtains the preset identifier by parsing the signaling, and then determines that the power saving message is received; or a dedicated message having a power saving message identifier may be used as the power saving message.

According to the sleeping method of a master-slave network provided in this embodiment of the present invention, a master device determines a target sublink according to an idle state, recorded in a link management list, of a slave device, and then sends a power saving message to at least one slave device on the target sublink. After receiving the power saving message, the slave device disables signal transmission. Because the slave device disables a signal transmission function, energy consumption is significantly reduced, and a power saving effect is achieved.

Figure 4:
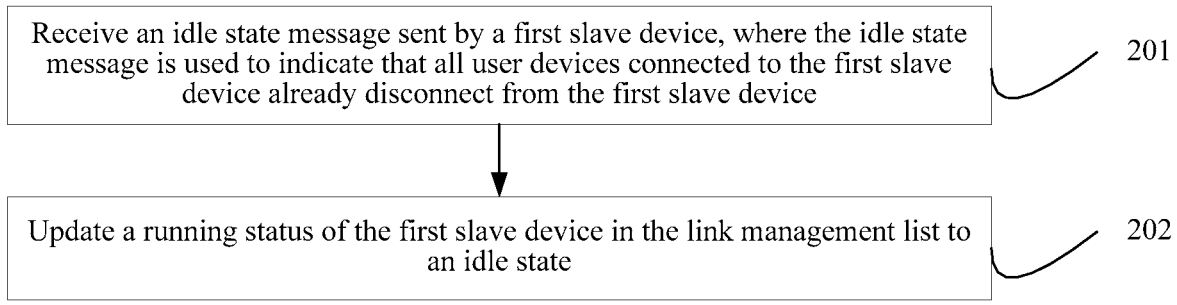
FIG. 4 is a flowchart of a second sleeping method of a master-slave network according to an embodiment of the present invention.

The present invention further provides a sleeping method of a master-slave network, which is used to update the link management list based on the method shown in FIG. 3. As shown in FIG. 4, before the obtaining, from a link management list, running statuses of slave devices on links in step 101, the invention further includes:

Step 201: Receive an idle state message sent by a first slave device, where the idle state message is used to indicate that all user devices connected to the first slave device already disconnect from the first slave device.

The idle state message may be defined according to a use habit of a user. For example, a predefined identifier is added to existing signaling, the slave device obtains the preset identifier by parsing the signaling, and then determines that the idle state message is received; or a dedicated message having an idle state message identifier may be used as the idle state message. It should be noted that the first slave device may be any slave device in the master-slave network rather than being specified, and is merely for ease of description.

Step 202: Update a running status of the first slave device in the link management list to an idle state.

After receiving the idle state message sent by the slave device, the master device updates the running status of the slave device in the link management list from an operating state to the idle state.

According to the sleeping method of a master-slave network provided in this embodiment of the present invention, a link management list can be updated according to an idle state message sent by a slave device, ensuring timeliness of the link management list.

Figure 5:
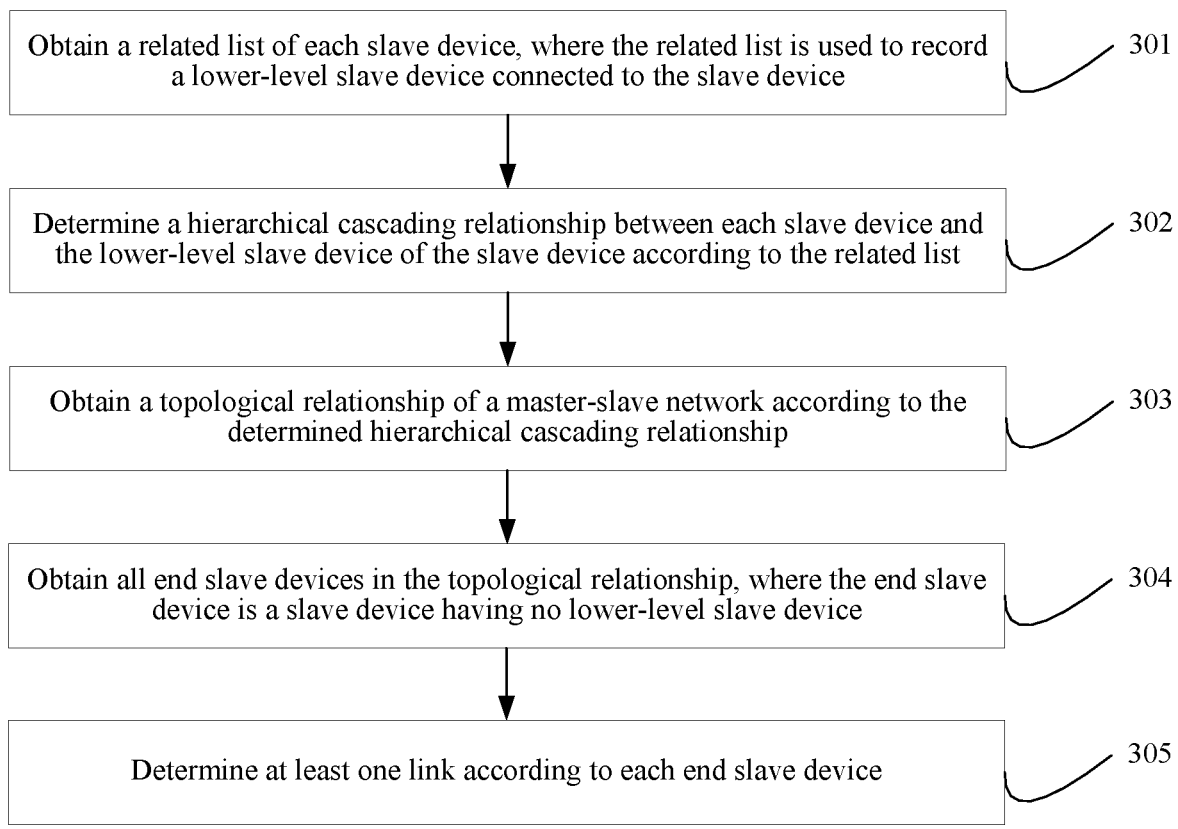
FIG. 5 is a flowchart of a third sleeping method of a master-slave network according to an embodiment of the present invention.

An embodiment of the present invention further provides a sleeping method of a master-slave network. As a further description of the foregoing method, as shown in FIG. 5, the method further includes:

Step 301: Obtain a related list of each slave device, where the related list is used to record a lower-level slave device connected to the slave device.

The related list is preset in the slave device by a user. Each slave device has one related list, and the related list stores the lower-level slave device and a lower-level user device mounted under the slave device. An obtaining manner may be: each slave device sends a related list to the master device, or each slave device sends, level by level, a related list to the master device by using an upper-level cascading slave device.

Step 302: Determine a hierarchical cascading relationship between each slave device and the lower-level slave device of the slave device according to the related list.

If a related list of a second slave device includes a third slave device, it is determined that the second slave device is an upper-level slave device of the third slave device, and a cascading relationship <the second slave device, the third slave device> can be obtained. By analogy, all the cascading relationships in the master-slave network are obtained.

Step 303: Obtain a topological relationship of the master-slave network according to the determined hierarchical cascading relationship.

In a set of all the obtained cascading relationships, a first element in the cascading relationships is at least one cascading relationship of the master device. Second element content of each cascading relationship is obtained, then a cascading relationship using the second element content as a first element is searched for, and a hierarchical cascading relationship between the master device and the second element content of each cascading relationship is established. A similar process is performed, until all the cascading relationships are traversed.

The topological relationship of the master-slave network can be determined according to the obtained cascading relationships. For example, currently, there are the following cascading relationships from an upper level to a lower level: <the master device, a slave device a>, <the slave device a, a slave device b>, <the slave device a, a slave device c>, <the slave device b, null>, and <a slave device c, null>. First, <the master device, the slave device a> is found; the "slave device a" is read, and a cascading relationship whose first element is the "slave device a" is searched for, to obtain <the slave device a, the slave device b> and <the slave device a, the slave device c>; and a hierarchical cascading relationship of the slave device a, the slave device b, and the slave device c is established. Then, <the slave device b, null> is found according to the slave device b, and <the slave device c, null> is found according to the slave device c, so that the topological relationship of the master-slave network is obtained.

Step 304: Obtain all end slave devices in the topological relationship, where the end slave device is a slave device having no lower-level slave device.

A cascading relationship whose second element is null is searched for, and first element content in the cascading relationship is determined as an end slave device. In the foregoing example, end slave devices are the slave device b and the device c.

Step 305: Determine at least one link according to each end slave device.

A cascading relationship A whose second element is an end slave device is searched for, and first element content in each cascading relationship A is read. The first element content in the cascading relationship A is used as an upper-level slave device of the end slave device. The following steps are performed for the first element of each cascading relationship A: searching for a cascading relationship B whose second element is the first element content in the cascading relationship A; and reading first element content of each cascading relationship B, and using the first element content of the cascading relationship B as an upper-level slave device of the first element content in the cascading relationship A. By analogy, at least one link from the end slave device towards the master device is obtained. In the foregoing example, a link selected based on the slave device b is the slave device b, the slave device a, and the master device; and a link selected based on the slave device c is the slave device c, the slave device a, and the master device. In the present invention, generated information about the slave device on each link is stored in the link management list.

According to the sleeping method of a master-slave network provided in this embodiment of the present invention, a link can be generated according to a related list sent by each slave device, and then a topological relationship of a master-slave network is generated in a master device, so that the master device can manage the slave device in the master-slave network by using the link management list. When a new slave device connects to the master-slave network, the link management list can be updated in time, ensuring timeliness of the link management list.

An embodiment of the present invention further provides a sleeping method of a master-slave network. As a further description of the foregoing embodiment, the method is used to describe a sleeping policy when the master device has a function of the slave device, and the method further includes:

if the running statuses of all the slave devices in the link management list are idle, entering, by the master device, a sleep and listen state.

When the master device has a function of the slave device, the master device provides a service to the outside (broadcasting a radio-frequency signal available for a user device). When all the slave devices (all the links) in the link management list managed by the master device are idle, the master device enters a sleep and listen state, and waits to be woken up. If the master device can also enter a sleep and listen state, the master device may be woken up by using a slave device wake-up method described subsequently.

According to the sleeping method of a master-slave network provided in this embodiment of the present invention, when each slave device is idle, a master device can cancel signal transmission, and enter a sleep and listen state, further saving power.

An embodiment of the present invention further provides a sleeping method of a master-slave network, as a specific description of the foregoing embodiment, the sending a power saving message to at least one slave device on the target sublink in step 103 may be implemented in any one of the following manners.

1) Send the power saving message to all slave devices on the target sublink.

To achieve a maximum energy saving effect, the power saving message is sent to all the slave devices on the target sublink. It should be noted that, because the target sublink has a cascading relationship, first, the power saving message is sent to a lowest-level slave device of the target sublink; and then, the power saving message is sequentially sent to slave devices from bottom up, to avoid a problem that because an upper-layer slave device enters a sleep and listen state before a lower-level slave device, the lower-level slave device cannot receive the power saving message sent by the master device.

2) Select one slave device level by level from the end slave device of the target sublink, and sequentially send the power saving message to the selected slave device.

Because wake-up causes a small delay, the power saving message is sequentially sent to at least one slave device starting from a lowest-level slave device (the end slave device) on the target sublink, so that another slave device that does not cancel signal transmission on the target sublink may be used to receive, at any time, a network request sent by a user device, and power saving is implemented. Meanwhile, another slave device that does not close signal transmission does not need be woken up to provide a network service to a user device, so that a response speed of the network service is increased.

3) Send the power saving message to a preset slave device on the target sublink.

During the operation and maintenance of a network, the power saving message may be sent to a particular slave device on the target sublink.

An embodiment of the present invention further provides a sleeping method of a master-slave network. As a further description of the foregoing embodiment, the method further includes:

timing running duration of the master-slave network, and if a timing result is greater than preset running duration, sending the power saving message to each slave device. Optionally, running duration of the master device is timed, and if the running duration of the master device is greater than the preset running duration, the power saving message is sent to each slave device.

During the operation and maintenance of a network, the master-slave network may need to be maintained at a regular period, or the master-slave network may need to hibernate at a regular period. On such basis, timing starts when a running status of a slave device in the master-slave network is running. When a timing result is greater than preset duration (such as 12 hours), the power saving message is sent to all the slave devices in the master-slave network. In an application scenario of the present invention, a master-slave network is deployed in a house. A parent sets preset running duration to two hours, to control an online time of a child. When running duration of the master-slave network reaches two hours, the master-slave network automatically enters a sleep mode.

Alternatively, if a system time reaches a preset power saving time, the power saving message is sent to each slave device.

During the operation and maintenance of a network, the master-slave network may further need to be maintained at a fixed time, or the master-slave network may need to hibernate at a fixed time, for example, at eight o'clock in the evening of every Sunday. Therefore, when the system time reaches the preset power saving time, the power saving message is sent to each slave device.

Figure 6:
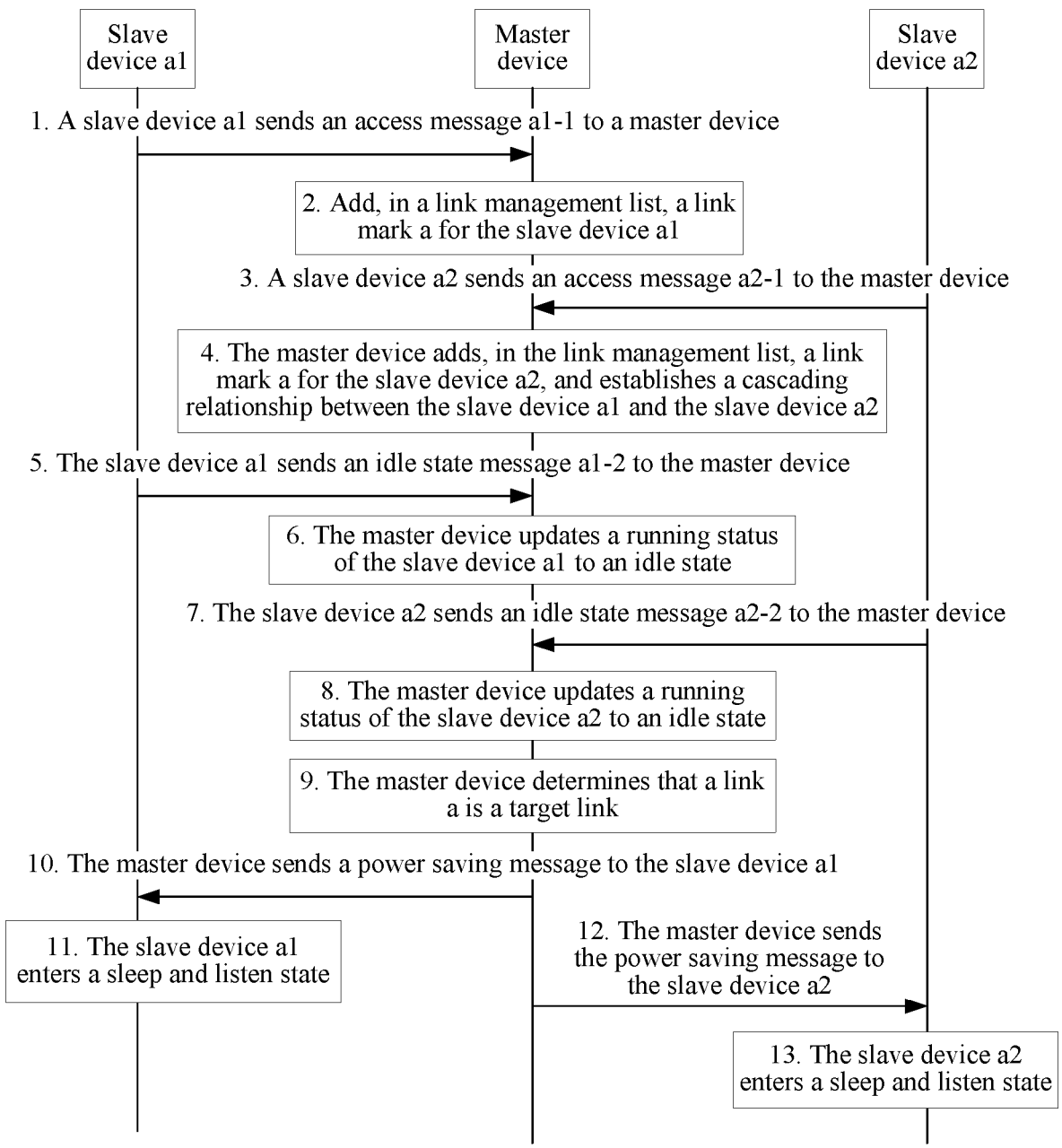
FIG. 6 is a flowchart of a sleeping method of a master-slave network in an application scenario according to an embodiment of the present invention.

The following further describes the foregoing sleeping method of a master-slave network by using an application scenario. As shown in FIG. 6, the master-slave network includes a link a, and the link a includes a slave device a1 and a slave device a2. The slave device a1 is an upper-layer slave device of the slave device a2.

1: When joining the master-slave network, the slave device a1 sends an access message a1-1 to a master device.

2: The master device adds, in a link management list, a link mark a for the slave device a1. Because only the slave device a1 exists on the current link a, it is determined that the slave device a1 is an uppermost-layer slave device of the link a, and an upper-level device of the slave device a1 is the master device.

3: When joining the master-slave network, the slave device a2 sends an access message a2-1 to the master device.

4: The master device adds, in the link management list, a link mark a for the slave device a2, and establishes a cascading relationship between the slave device a1 and the slave device a2. Because the slave device a1 already exists on the current link a, after determining a hierarchical cascading relationship between the slave device a1 and the slave device a2, the master device adds the slave device a2 to the link a. It is obtained by means of determining according to an IP address of a packet that the slave device a1 is an upper-layer slave device of the slave device a2.

5: When all user devices of the slave device a1 disconnect from the master-slave network (when no user device is connected to the master-slave network by using the slave device), the slave device a1 sends an idle state message a1-2 to the master device.

6: The master device updates a running status of the slave device a1 to an idle state according to the received idle state message a1-2. The master device checks whether running statuses of all slave devices on the link a in the link management list are all idle. Currently, the slave device a1 is in an idle state, and the slave device a2 is in an operating state.

7: When all user devices of the slave device a2 disconnect from the master-slave network (when no user device is connected to the master-slave network by using the slave device), the slave device a2 sends an idle state message a2-2 to the master device.

8: The master device updates a running status of the slave device a2 to an idle state according to the received idle state message a2-2.

9: The master device checks whether running statuses of all slave devices on the link a in the link management list are all idle. In this case, the slave device a1 and the slave device a2 on the link a are both in an idle state; therefore the link a is a target sublink.

10: The master device sends a power saving message to the slave device a1.

11: The slave device a1 enters a sleep and listen state after receiving the power saving message.

12: The master device sends the power saving message to the slave device a2.

13: The slave device a2 enters a sleep and listen state after receiving the power saving message.

The following describes an implementation process in which a slave device entering a sleep and listen state is woken up.

Figure 7:
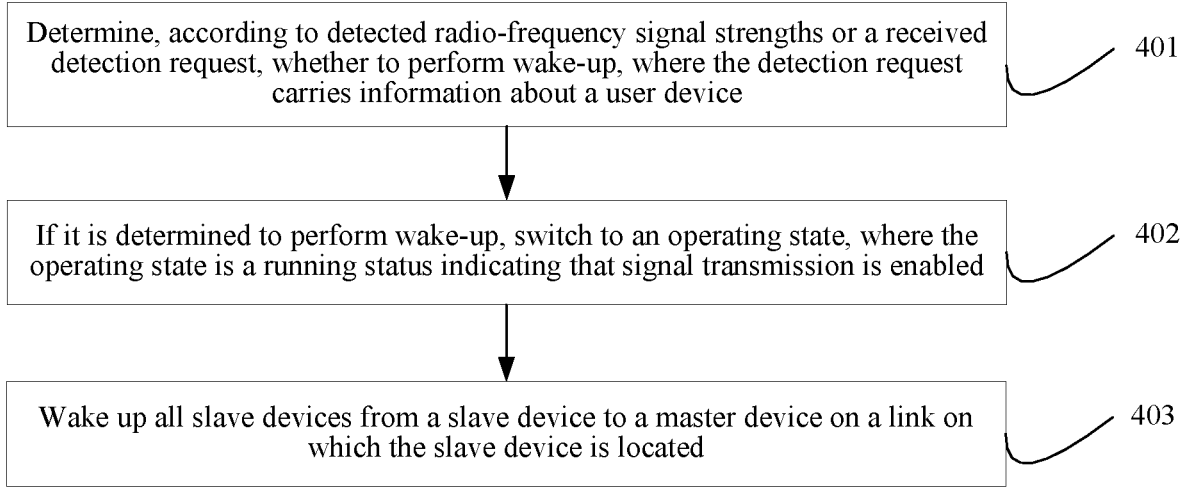
FIG. 7 is a flowchart of a first wake-up method of a master-slave network according to an embodiment of the present invention.

An embodiment of the present invention further provides a wake-up method of a master-slave network. The master-slave network includes a master device and at least one slave device, the at least one slave device forms at least one link, and adjacent slave devices on each link have a hierarchical cascading relationship. The method is applied to a slave device in a sleep and listen state, and the sleep and listen state is a running status indicating that signal transmission is disabled. As shown in FIG. 7, the method includes:

Step 401: Determine, according to detected radio-frequency signal strengths or a received detection request, whether to perform wake-up, where the detection request carries information about a user device.

After entering a sleep and listen state, a slave device listens to a surrounding signal, such as a radio-frequency signal strength or a detection request. The following separately describes the foregoing two wake-up manners in detail.

1: Determine, according to the radio-frequency signal strengths, whether to perform wake-up.

Figure 8:
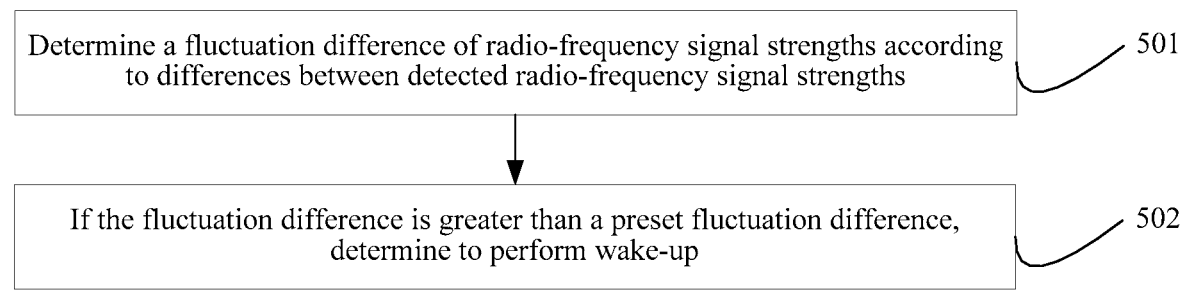
FIG. 8 is a flowchart of a second wake-up method of a master-slave network according to an embodiment of the present invention.

As shown in FIG. 8, the determining, according to a radio-frequency signal strength detected by the slave device, whether to perform wake-up in step 401 specifically includes:

Step 501: Determine a fluctuation difference of the radio-frequency signal strengths according to differences between the detected radio-frequency signal strengths.

Step 502: If the fluctuation difference is greater than a preset fluctuation difference, determine to perform wake-up.

The fluctuation difference includes: a mean square error (MSE), a root mean square error (RMSE), and a mean absolute percentage error (MAPE). If a surrounding environment of the slave device has always been relatively stable, the foregoing three values should approximate 0. When it is detected that any one of the foregoing three indicators is greater than a target error standard (the preset fluctuation difference), it indicates that a user device exists around the slave device, and the slave device needs to be woken up. The following separately provides formulas for calculating the mean square error (MSE), the root mean square error (RMSE), and the mean absolute percentage error (MAPE).

$$RMSE = \sqrt{\frac{1}{n}\sum_{i=1}^{n}(\text{observed}_i - \text{predicted}_i)^2}$$

$$MSE = \frac{1}{n}\sum_{i=1}^{n}(\text{observed}_i - \text{predicted}_i)^2$$

$$MAPE = \sum_{i=1}^{n}\left|\frac{\text{observed}_i - \text{predicted}_i}{\text{observed}_i}\right| \times \frac{100}{n}$$

For each group, strengths of n adjacent radio-frequency signals (for example, Wi-Fi is obtained in unit of frames) are obtained. observed represents a group of (n) previously obtained signal strength samples, and predicted represents a group of (n) currently obtained signal strength samples.

In addition, this embodiment of the present invention further provides a method for determining a preset signal fluctuation value:

S1: When a slave device is in an operating state, count m groups of signal strength values (each group includes n signal strength values), where a strength of a radio-frequency signal sent by a UD device connected to a link is not counted.

S2: When the slave device enters a sleep and listen state, count m groups of signal strength values (each group includes n signal strength values).

S3: Separately calculate m groups of average values of average mean square errors of m groups of samples, m groups of average values of average root mean square errors of the m groups of samples, m groups of average values of mean absolute percentage errors of the m groups of samples, that is, perform mean square error calculation on the first group of samples in an operating state and the first group of samples in a sleep and listen mode, to obtain m mean square errors, calculate an average value of the m mean square errors, and use the value as a preset signal fluctuation value.

Learning may be continuously performed on the preset signal fluctuation value when the device is powered on, that is, m approximate infinity, which can ensure that a longer time indicates better determining accuracy.

2: Determine, according to the received detection request, whether to perform wake-up.

Figure 9:
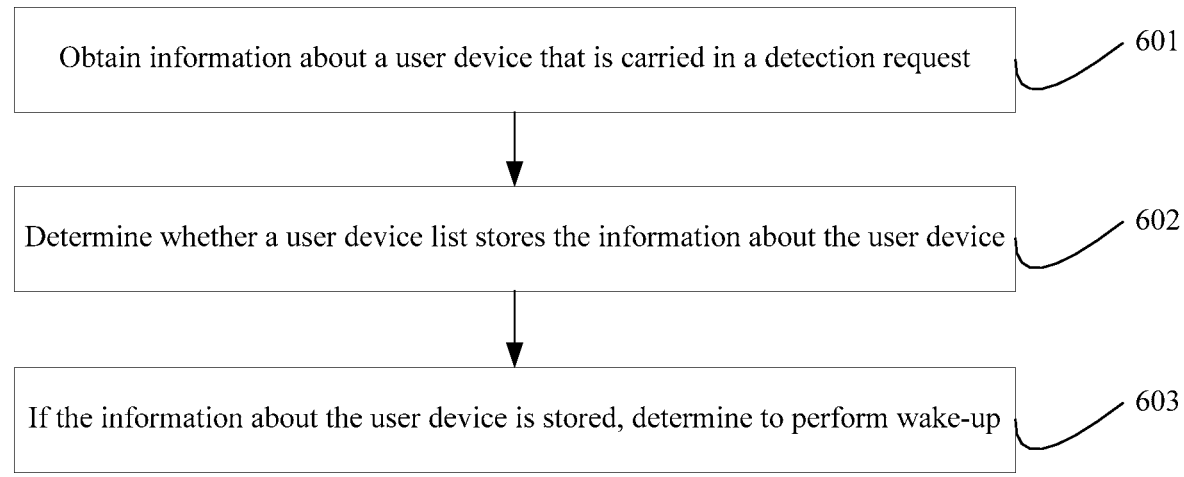
FIG. 9 is a flowchart of a third wake-up method of a master-slave network according to an embodiment of the present invention.

As shown in FIG. 9, the determining, according to a received detection request, whether to perform wake-up in step 401 specifically includes:

Step 601: Obtain information about a user device that is carried in the detection request.

The detection request carries the information about the user device, and the information is used to uniquely identify the user device.

Step 602: Determine whether a user device list stores the information about the user device.

A slave device stores information about a user device that previously establishes a connection to the slave device. The user device initiates the detection request to a master-slave network to which the user device previously connects, to detect whether a master-slave network to which the user device previously connects exists. The slave device determines, according to the information about the user device in the detection request, whether the user device is a user device that previously connects to the slave device, and if yes, wake-up is performed. In an application scenario of this embodiment of the present invention, a user is disconnected from a master-slave network in a house. When the user returns home from work, a user device sends a detection request to a slave device of the master-slave network in the house, and the user does not need to manually connect the user device to the master-slave network, improving communication efficiency.

Step 603: If the information about the user device is stored, determine to perform wake-up.

After the slave device detects the detection request, if the detection request points to a master-slave network in which the slave device is located, the slave device is woken up from a sleep and listen mode.

Step 402: If it is determined to perform wake-up, switch to an operating state, where the operating state is a running status indicating that signal transmission is enabled.

Step 403: Wake up all slave devices from a slave device to a master device on a link on which the slave device is located.

After determining to perform wake-up, the slave device enables signal transmission, so as to provide a network service for the user device. Because the slave device needs to use the master device to communicate with a core network, the slave device may send a wake-up indication to an upper-level slave device of the slave device, so that all the slave devices from the slave device to the master device are woken up level by level, and the link is restored.

According to the sleeping and wake-up methods of a master-slave network provided in this embodiment of the present invention, a slave device in a sleep and listen state determines, by detecting a surrounding signal (a radio-frequency signal strength or a detection request), whether to perform wake-up. After the slave device is woken up, a slave device on a target sublink is woken up level by level by using a wake-up indication, so that when a terminal belonging to the slave device needs to use a network, a link from the slave device to a master device is woken up, to provide a network service to the terminal.

By means of the foregoing two processes, in the present invention, when no terminal needs a network, all or some slave devices on a sublink (or multiple links or even all links) of a master-slave network can be controlled to close signal transmission, so as to achieve a power saving effect. After closing signal transmission, a slave device listens to a surrounding signal, to determine whether there is a terminal needing to use a network. When a terminal needs to use the network, the slave device can automatically wake up all slave devices between the slave device and a master device, so as to provide a corresponding network service to the terminal, thereby ensuring network reliability.

An embodiment of the present invention further provides a wake-up method of a master-slave network. As a further description of the foregoing embodiment, the method further includes:

enabling timing when the slave device cancels signal transmission; and if a timing result is greater than preset power saving duration, sending the wake-up indication to each slave device from the slave device to an end slave device on the link (that is, a target sublink determined in a power saving process) on which the slave device is located; or if a system time reaches a preset wake-up time, sending the wake-up indication to each slave device from the slave device to an end slave device on the link on which the slave device is located.

According to the wake-up method of a master-slave network provided in this embodiment of the present invention, timing can be enabled when a slave device cancels signal transmission. When the timing reaches preset power saving duration, a wake-up indication is sent to each slave device from the slave device to an end slave device on a link on which the slave device is located. Optionally, when a system time reaches a preset wake-up time, a wake-up indication may be sent to each slave device from the slave device to an end slave device on a link on which the slave device is located.

Further, the method further includes: if the slave device receives a wake-up indication sent by a lower-level slave device of the slave device, enabling, by the slave device, signal transmission and sending the wake-up indication to an upper-level slave device of the slave device.

Figure 10:
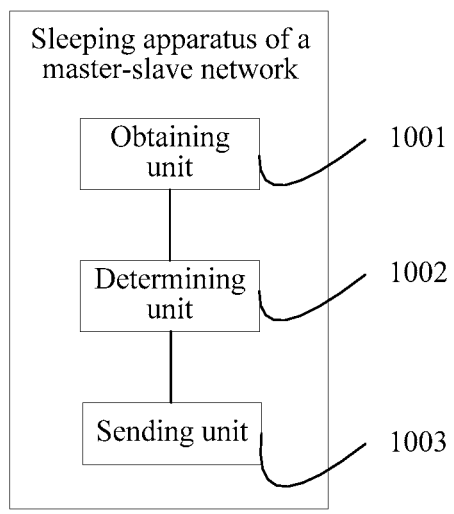
FIG. 10 is a schematic structural diagram of a first sleeping apparatus of a master-slave network according to an embodiment of the present invention.

An embodiment of the present invention further provides a sleeping apparatus of a master-slave network, where the master-slave network includes a master device and at least one slave device, the at least one slave device forms at least one link, and adjacent slave devices on each link have a hierarchical cascading relationship. The apparatus is located in the master device, and as shown in FIG. 10, the apparatus includes:

an obtaining unit 1001, configured to obtain, from a link management list, running statuses of slave devices on links, where the link management list is used to store a cascading relationship between the slave devices on the links of the master-slave network, and a running status of each slave device;

a determining unit 1002, configured to: determine a target device from the link obtained by the obtaining unit 1001, where the target device is a slave device whose running status is idle; and when running statuses of the target slave device to an end slave device on a link on which the target slave device is located are all idle, determine that a sublink from the target slave device to the end slave device on the link on which the target slave device is located is a target sublink; and a sending unit 1003, configured to send a power saving message to at least one slave device on the target sublink determined by the determining unit 1002, so that the slave device enters a sleep and listen state when receiving the power saving message, where the sleep and listen state is a running status indicating that signal transmission is disabled.

According to the sleeping apparatus of a master-slave network provided in this embodiment of the present invention, the master device determines a target sublink according to an idle state, recorded in a link management list, of a slave device, and then sends a power saving message to at least one slave device on the target sublink. After receiving the power saving message, the slave device disables signal transmission and enters a sleep and listen state, so as to achieve a power saving effect.

Figure 11:
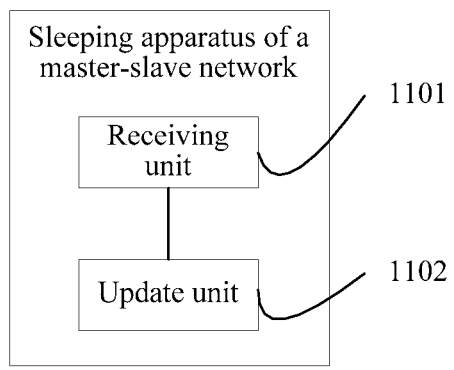
FIG. 11 is a schematic structural diagram of a second sleeping apparatus of a master-slave network according to an embodiment of the present invention.

Further, as shown in FIG. 11, the apparatus further includes:

a receiving unit 1101, configured to receive an idle state message sent by a first slave device, where the idle state message is used to indicate that all user devices connected to the first slave device already disconnect from the first slave device; and an update unit 1102, configured to update a running status of the first slave device in the link management list to an idle state according to the idle state message received by the receiving unit 1101.

Further, the obtaining unit is further configured to obtain a related list of each slave device, where the related list is used to record a lower-level slave device connected to the slave device;

the determining unit is further configured to determine a hierarchical cascading relationship between each slave device and the lower-level slave device of the slave device according to the related list received by a second receiving unit, and obtain a topological relationship of the master-slave network according to the determined hierarchical cascading relationship;

the obtaining unit is further configured to obtain all end slave devices in the topological relationship obtained by the second determining unit, where the end slave device is a slave device having no lower-level slave device; and the determining unit is further configured to determine at least one link according to each end slave device.

Further, the sending unit is further configured to: when the running statuses of all the slave devices in the link management list are idle, enter a sleep and listen state.

Further, the sending unit 1003 is further configured to:

send the power saving message to all slave devices on the target sublink; or select one slave device level by level from the end slave device of the target sublink, and sequentially send the power saving message to the selected slave device; or send the power saving message to a preset slave device on the target sublink.

Figure 12:
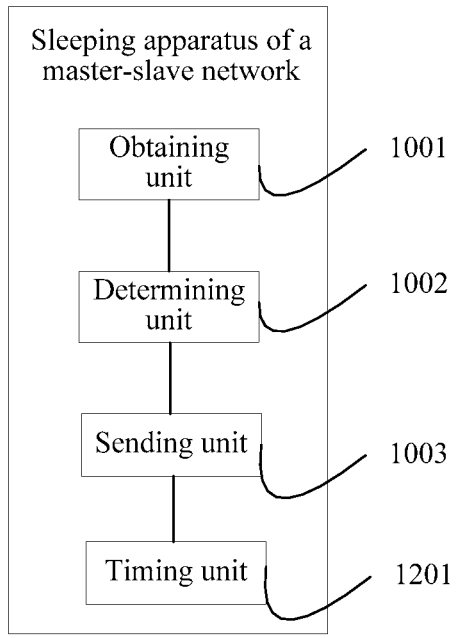
FIG. 12 is a schematic structural diagram of a third sleeping apparatus of a master-slave network according to an embodiment of the present invention.

Further, as shown in FIG. 12, the apparatus further includes:

a timing unit 1201, configured to time running duration of the master-slave network; and the sending unit 1003 is further configured to: when a timing result obtained by the timing unit 1201 is greater than preset running duration, send the power saving message to each slave device; or the sending unit 1003 is further configured to: when a system time reaches a preset power saving time, send the power saving message to each slave device.

Figure 13:
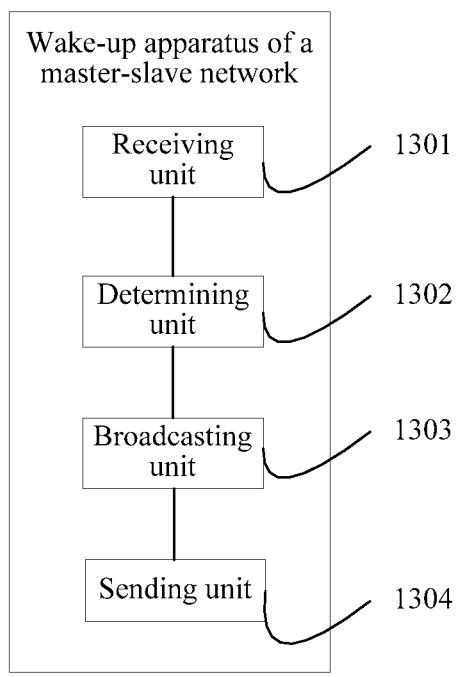
FIG. 13 is a schematic structural diagram of a first wake-up apparatus of a master-slave network according to an embodiment of the present invention.

An embodiment of the present invention further provides a wake-up apparatus of a master-slave network. The master-slave network includes a master device and at least one slave device, the at least one slave device forms at least one link, and adjacent slave devices on each link have a hierarchical cascading relationship. The apparatus is located in a slave device in a sleep and listen state, as shown in FIG. 13, the apparatus includes:

a determining unit 1302, configured to determine, according to radio-frequency signal strengths detected by a receiving unit 1301 or a detection request received by a receiving unit, whether wake-up is to be performed, where the detection request is used to connect to the master-slave network;

a broadcasting unit 1303, configured to: when the determining unit 1302 determines that wake-up is to be performed, switch to an operating state, where the operating state is a running status indicating that signal transmission is enabled; and a sending unit 1304, configured to: when the determining unit 1302 determines that wake-up is to be performed, wake up all slave devices from the slave device to the master device on a link on which the slave device is located.

According to the sleeping and wake-up apparatuses of a master-slave network provided in this embodiment of the present invention, a slave device in a sleep and listen state determines, by detecting a surrounding signal (a radio-frequency signal strength or a detection request), whether to perform wake-up. After the slave device is woken up, a slave device on a target sublink is woken up level by level by using a wake-up indication, so that when a terminal belonging to the slave device needs to use a network, a link from the slave device to a master device is woken up, to provide a network service to the terminal.

Further, the determining unit 1302 is further configured to: determine a fluctuation difference of the radio-frequency signal strengths according to differences between the radio-frequency signal strengths detected by the receiving unit 1301; and when the fluctuation difference is greater than a preset fluctuation difference, determine that wake-up is to be performed.

Further, the determining unit 1302 is further configured to: obtain information about a user device that is carried in the detection request; determine whether a user device list stores the information about the user device sending the detection request; and if the information about the user device is stored, determine that wake-up is to be performed, where the user device list is used to record information about a user device that previously connects to the slave device.

Figure 14:
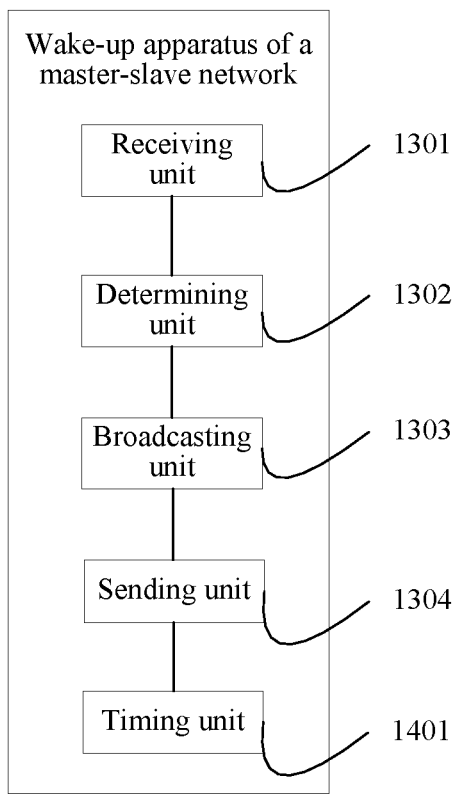
FIG. 14 is a schematic structural diagram of a second wake-up apparatus of a master-slave network according to an embodiment of the present invention.

Further, as shown in FIG. 14, the apparatus further includes:

a timing unit 1401, configured to enable timing when the broadcasting unit 1303 disables signal transmission; and the sending unit 1304 is further configured to: when a timing result of the timing unit 1401 is greater than preset power saving duration, send the wake-up indication to each slave device from the slave device to an end slave device on the link on which the slave device is located; or the sending unit 1304 is further configured to: when a system time reaches a preset wake-up time, send the wake-up indication to each slave device from the slave device to an end slave device on the link on which the slave device is located.

Further, the apparatus further includes:

the receiving unit 1301 is further configured to receive a wake-up indication sent by a lower-level slave device of the slave device;

the broadcasting unit 1303 is further configured to: when the receiving unit receives the wake-up indication, enable signal transmission; and the sending unit 1304 is further configured to: when the receiving unit receives the wake-up indication, send a wake-up indication to an upper-level slave device of the slave device.

Figure 15:
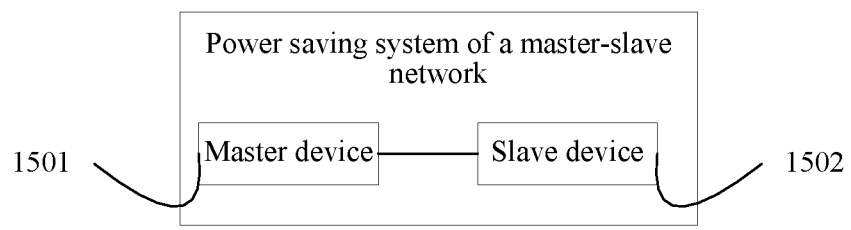
FIG. 15 is a schematic diagram of a first power saving system of a master-slave network according to an embodiment of the present invention.

An embodiment of the present invention further provides a power saving system of a master-slave network. As shown in FIG. 15, the system includes a master device 1501 and a slave device 1502, the master device includes the sleeping apparatuses of a master-slave network that are shown in FIG. 10 to FIG. 12, and the slave device includes the wake-up apparatuses of a master-slave network that are shown in FIG. 13 to FIG. 14.

Figure 16:
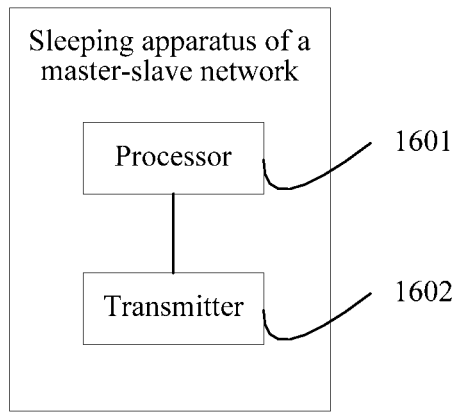
FIG. 16 is a schematic structural diagram of a fourth sleeping apparatus of a master-slave network according to an embodiment of the present invention.

An embodiment of the present invention further provides a sleeping apparatus of a master-slave network. The master-slave network includes a master device and at least one slave device, the at least one slave device forms at least one link, and adjacent slave devices on each link have a hierarchical cascading relationship. The apparatus is located in the master device, and as shown in FIG. 16, the apparatus includes:

a processor 1601, configured to: obtain, from a link management list, running statuses of slave devices on links, where the link management list is used to store a cascading relationship between the slave devices on the links of the master-slave network, and a running status of each slave device;

determine a target device, where the target device is a slave device whose running status is idle; and if running statuses of the target slave device to an end slave device on a link on which the target slave device is located are all idle, determine that a sublink from the target slave device to the end slave device on the link on which the target slave device is located is a target sublink; and a transmitter 1602, configured to send a power saving message to at least one slave device on the target sublink, so that the slave device enters a sleep and listen state when receiving the power saving message, where the sleep and listen state is a running status indicating that signal transmission is disabled.

Figure 17:
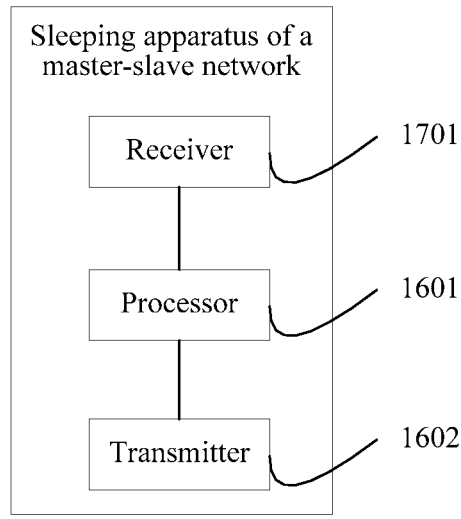
FIG. 17 is a schematic structural diagram of a fifth sleeping apparatus of a master-slave network according to an embodiment of the present invention.

Further, as shown in FIG. 17, the apparatus further includes:

a receiver 1701, configured to receive an idle state message sent by a first slave device, where the idle state message is used to indicate that all user devices connected to the first slave device already disconnect from the first slave device; and the transmitter 1602 is further configured to update a running status of the first slave device in the link management list to an idle state.

Further, the processor 1601 is further configured to:

obtain a related list of each slave device, where the related list is used to record a lower-level slave device connected to the slave device;

determine a hierarchical cascading relationship between each slave device and the lower-level slave device of the slave device according to the related list;

obtain a topological relationship of the master-slave network according to the determined hierarchical cascading relationship;

obtain all end slave devices in the topological relationship, where the end slave device is a slave device having no lower-level slave device; and determine at least one link according to each end slave device.

Further, the transmitter 1602 is further configured to: when the running statuses of all the slave devices in the link management list are idle, enter a sleep and listen state.

Further, the transmitter 1602 is further configured to:

send the power saving message to all slave devices on the target sublink; or select one slave device level by level from the end slave device of the target sublink, and sequentially send the power saving message to the selected slave device; or send the power saving message to a preset slave device on the target sublink.

Further, the processor 1601 is further configured to time running duration of the master-slave network; and the transmitter 1602 is further configured to: when a timing result of the processor 1601 is greater than preset running duration, send the power saving message to each slave device; or the transmitter 1602 is further configured to: when a system time reaches a preset power saving time, send the power saving message to each slave device.

Figure 18:
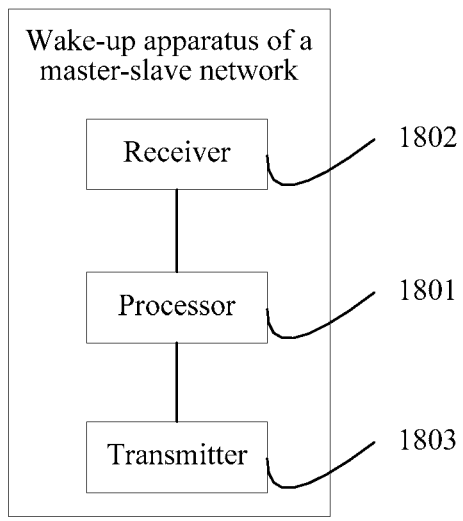
FIG. 18 is a schematic structural diagram of a sixth wake-up apparatus of a master-slave network according to an embodiment of the present invention.

An embodiment of the present invention further provides a wake-up apparatus of a master-slave network. The master-slave network includes a master device and at least one slave device, the at least one slave device forms at least one link, and adjacent slave devices on each link have a hierarchical cascading relationship. The apparatus is located in a slave device in a sleep and listen state, as shown in FIG. 18, the apparatus includes:

a processor 1801, configured to determine, according to radio-frequency signal strengths detected by a receiver 1802 or a detection request received by a receiver 1802, whether wake-up is to be performed, where the detection request is used to connect to the master-slave network; and if it is determined that wake-up is to be performed, switch to an operating state, where the operating state is a running status indicating that signal transmission is enabled; and a transmitter 1803, configured to: when the processor 1801 determines that wake-up is to be performed, wake up all slave devices from the slave device to the master device on a link on which the slave device is located.

Further, the processor 1801 is further configured to: determine a fluctuation difference of the radio-frequency signal strengths according to differences between the detected radio-frequency signal strengths detected by the receiver 1802; and when the fluctuation difference is greater than a preset fluctuation difference, determine that wake-up is to be performed.

Further, the processor 1801 is further configured to: obtain information about a user device that is carried in the detection request; determine whether a user device list stores the information about the user device sending the detection request; and if the information about the user device is stored, determine that wake-up is to be performed.

Further, the processor 1801 is further configured to enable timing when the transmitter 1803 cancels signal transmission; and the transmitter 1803 is further configured to: when a timing result of the processor 1801 is greater than preset power saving duration, send the wake-up indication to each slave device from the slave device to an end slave device on the link on which the slave device is located; or the transmitter 1803 is further configured to: when a system time reaches a preset wake-up time, send the wake-up indication to each slave device from the slave device to an end slave device on the link on which the slave device is located.

Further, the receiver 1802 is further configured to receive a wake-up indication sent by a lower-level slave device of the slave device; and the transmitter 1803 is further configured to: when the receiver 1802 receives the wake-up indication, enable signal transmission and send a wake-up indication to an upper-level slave device of the slave device.

Figure 19:
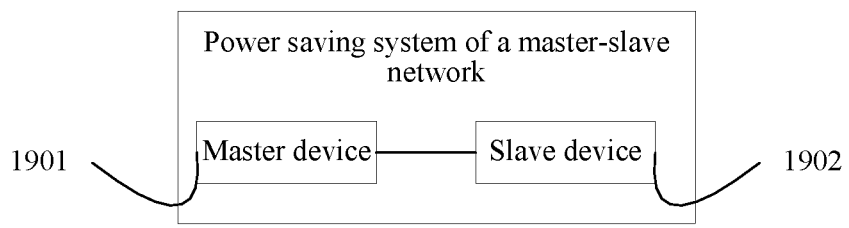
FIG. 19 is a schematic diagram of a seventh power saving system of a master-slave network according to an embodiment of the present invention.

An embodiment of the present invention further provides a power saving system of a master-slave network. As shown in FIG. 19, the system includes a master device 1901 and a slave device 1902, the master device includes the sleeping apparatuses of a master-slave network that are shown in FIG. 16 to FIG. 17, and the slave device includes the wake-up apparatus of a master-slave network shown in FIG. 18.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention.

What is claimed is:

1. A sleeping method in a master-slave network, wherein the master-slave network comprises a master device, a first slave device and a second slave device, wherein the first slave device is a lower level slave device connected to the master device and the second slave device is a lower level slave device connected to the first slave device, and wherein the method comprises:
    obtaining, by the master device, running statuses of the first slave device and the second slave device;
    determining, by the master device, the second slave device as a target slave device, wherein a running status of the target slave device is idle; and
    sending, by the master device, a power saving message to at least one of the first slave device or the second slave device in response to determining that the second salve device is the target slave device and that a running status of the first slave device is idle, wherein the at least one of the first slave device or the second slave device enters a sleep and listen state, wherein the sleep and listen state is a running status indicating that signal transmission is disabled.

2. The sleeping method in a master-slave network according to claim 1, wherein before the obtaining the running statuses of the first slave device and the second device, the method further comprises:
    receiving a first idle state message sent by the first slave device, wherein the first idle state message is used to indicate that the first slave device is idle; and
    receiving a second idle state message sent by the second slave device, wherein the second idle state message is used to indicate that the second slave device is idle.

3. The sleeping method in a master-slave network according to claim 1, wherein the method further comprises:
    entering, by the master device, a sleep and listen state when the running statuses of the first slave device and the second slave device are idle.

4. The sleeping method in a master-slave network according to claim 2, wherein the method further comprises:
    entering, by the master device, a sleep and listen state when the running statuses of the first slave device and the second slave device are idle.

5. The sleeping method in a master-slave network according to claim 1, wherein the step of sending, by the master device, the power saving message to the at least one of the first slave device or the second slave device comprises:
    sending, by the master device, the power saving message to the first slave device after sending the power saving message to the second slave device.

6. The sleeping method in a master-slave network according to claim 2, wherein the step of sending, by the master device, the power saving message to the at least one of the first slave device or the second slave device comprises:
    sending, by the master device, the power saving message to the first slave device after sending the power saving message to the second slave device.

7. The sleeping method in a master-slave network according to claim 1, wherein the method further comprises:
    timing, by the master device, running duration of the master-slave network; and
    sending, by the master device, the power saving message to the first slave device and the second slave device when a timing result is greater than preset running duration.

8. The sleeping method in a master-slave network according to claim 1, wherein the method further comprises:
  timing, by the master device, running duration of the master-slave network; and
  sending, by the master device, the power saving message to the first slave device and the second slave device when a system time reaches a preset power saving time.

9. A wake-up method in a master-slave network, wherein the master-slave network comprises a master device, a first slave device and a second slave device, wherein the first slave device is a lower level slave device connected to the master device and the second slave device is a lower-level slave device connected to the first slave device, and wherein the method comprises:
  determining, by the master device, according to one of detected radio-frequency signal strengths and a received detection request, whether to perform wake-up, wherein the detection request is used to connect to the master-slave network;
  switching to an operating state in response to determining to perform wake-up, wherein the operating state is a running status indicating that signal transmission is enabled; and
  waking up the first slave device and the second slave device.

10. The wake-up method in a master-slave network according to claim 9, wherein the determining, according to radio-frequency signal strengths detected by the first slave device or the second slave device, whether to perform wake-up specifically comprises:
  determining a fluctuation difference of the radio-frequency signal strengths according to differences between the detected radio-frequency signal strengths; and
  determining to perform wake-up when the fluctuation difference is greater than a preset fluctuation difference.

11. The wake-up method in a master-slave network according to claim 9, wherein the determining, according to a received detection request, whether to perform wake-up comprises:
  obtaining information about a user device that is carried in the detection request;
  determining whether a user device list stores the information about the user device; and
  determining to perform wake-up when the information about the user device is stored.

12. The wake-up method in a master-slave network according to claim 9, wherein the method further comprises:
  enabling timing when one of the first slave device and the second slave device disables signal transmission; and
  sending a wake-up indication to the first slave device and the second slave device when a timing result is greater than preset power saving duration.

13. The wake-up method in a master-slave network according to claim 9, wherein the method further comprises:
  enabling timing when the first slave device and the second slave device disables signal transmission; and
  sending a wake-up indication to the first slave device and the second slave device when a system time reaches a preset wake-up time.

14. A sleeping apparatus in a master-slave network, wherein the master-slave network comprises a master device, a first slave device and a second slave device, wherein the first slave device is a lower level slave device connected to the master device and the second slave device is a lower-level slave device connected to the first slave device, and wherein the apparatus comprises:
  at least one processor;
  a memory storing instructions executable by the at least one processor, wherein the instructions, when executed by the at least one processor, instruct the at least one processor to obtain running statuses of the first slave device and the second slave device and to determine the second slave device as a target slave device, wherein a running status of the target slave device is idle; and
  a transmitter, configured to send a power saving message to one of the first slave device and the second slave device in response to determining that the second salve device is the target slave device and a running status of the first slave device is idle, wherein the at least one of the first slave device or the second slave device enters a sleep and listen state, wherein the sleep and listen state is a running status indicating that signal transmission is disabled.

15. The sleeping apparatus in a master-slave network according to claim 14, wherein the apparatus further comprises:
  a receiver, configured to:
  receive a first idle state message sent by the first slave device, wherein the first idle state message is used to indicate that the first slave device is idle; and
  receive a second idle state message sent by the second slave device, wherein the second idle state message is used to indicate that the first slave device is idle.

16. The sleeping apparatus in a master-slave network according to claim 14, wherein the transmitter is further configured to enter a sleep and listen state when the running statuses of the first slave device and the second slave device are idle.

17. The sleeping apparatus in a master-slave network according to claim 14, wherein the transmitter is further configured to send the power saving message to the first slave device after sending the power saving message to the second slave device.

18. The sleeping apparatus in a master-slave network according to claim 16, wherein the transmitter is further configured to send the power saving message to the first slave device after sending the power saving message to the second slave device.

19. The sleeping apparatus in a master-slave network according to claim 16, wherein the instructions further instruct the at least one processor to time running duration of the master-slave network; and
  wherein the transmitter is further configured to send the power saving message to the first slave device and the second slave device when a timing result is greater than preset running duration.

20. The sleeping apparatus in a master-slave network according to claim 16, wherein the instructions further instruct the at least one processor to time running duration of the master-slave network; and
  wherein the transmitter is further configured to send the power saving message to the first slave device and the second slave device when a system time reaches a preset power saving time.

* * * * *